(12) United States Patent
Inoue

(10) Patent No.: US 7,198,238 B2
(45) Date of Patent: Apr. 3, 2007

(54) LEG DEVICE

(75) Inventor: Yasuhiko Inoue, Toyonaka (JP)

(73) Assignee: NIFCO Inc., Yokohama (JP)

( * ) Notice: Subject to any disclaimer, the term of this patent is extended or adjusted under 35 U.S.C. 154(b) by 52 days.

(21) Appl. No.: 11/090,155

(22) Filed: Mar. 28, 2005

(65) Prior Publication Data

US 2005/0218276 A1 Oct. 6, 2005

(30) Foreign Application Priority Data

Apr. 5, 2004 (JP) .............. 2004-110964

(51) Int. Cl.
*F16M 11/24* (2006.01)
(52) U.S. Cl. ................ 248/188.4; 248/188.8
(58) Field of Classification Search ............ 248/188.2, 248/188.4, 188.8, 677, 188.9, 188.1
See application file for complete search history.

(56) References Cited

U.S. PATENT DOCUMENTS 3,868,079 A * 2/1975 Johnson .................. 248/188.4

2002/0139908 A1 * 10/2002 Oyama et al. ........... 248/188.8
2005/0116134 A1 * 6/2005 Lee et al. .................... 248/650

FOREIGN PATENT DOCUMENTS

JP 11-082881 3/1999
JP 2003-311092 11/2003

* cited by examiner

*Primary Examiner*—Ramon O Ramirez
(74) *Attorney, Agent, or Firm*—Manaba Kanesaka

(57) ABSTRACT

A leg device includes a leg shaft with a male thread section having a contact section at a lower end thereof, and an elevating part supported on the leg shaft to be capable of rising and lowering. The elevating part includes a base section having a portion to be fixed to an object, a through hole for inserting the leg shaft, and a locking piece integrated with the base section at one end thereof. The locking piece has a female threaded section on a front surface of the other end thereof for engaging the male threaded section of the leg shaft, and an operation knob on a rear surface of the other end. The base section and locking piece are integrally formed to position the female threaded section of the locking piece inwardly beyond an outer surface of the leg shaft passing through the through hole.

6 Claims, 13 Drawing Sheets

LEG DEVICE

BACKGROUND OF THE INVENTION AND RELATED ART STATEMENT

The present invention relates to a leg device to be attached to an object as a leg of the object for adjusting a height of the object.

Japanese Patent Publications (Kokai) No. 11-82881 and No. 2003-311092 disclose height adjustable devices for supporting an object. The devices include a bolt-shaped leg with a ground contact section at a lower end thereof and a member having a nut for engaging a male thread section of the leg, so that the device adjusts a height of the object with the leg.

In the devices, it is necessary to provide at least four components: a case to be fastened to the object, a member disposed in the case as a nut, a spring for urging the member, and the leg as described above.

An object of the present invention is to provide a leg device with a minimal number of components.

Further objects and advantages of the invention will be apparent from the following description of the invention.

SUMMARY OF THE INVENTION

In order to attain the objects described above, according to the present invention, a leg device supports an object to adjust a height thereof. The leg device comprises a leg shaft with a male thread section having a ground contact section at a lower end thereof and an elevating part supported on the leg shaft to be capable of rising and lowering. The elevating part includes a base section having a portion to be fixed to the object, a through hole for inserting the leg shaft, and a locking piece integrated with the base section at one end thereof. The locking piece has a female threaded section on a front face of the other end thereof for engaging the male threaded section of the leg shaft, and an operation knob on a rear face of the other end. The base section and locking piece are integrally formed by plastic molding so as to position the female threaded section of the locking piece inwardly beyond an outer surface of the leg shaft passing through the through hole.

In the present invention, the leg device for supporting an object is appropriately constructed with two parts, i.e., the leg shaft and the elevating part. When the leg shaft is inserted into the through hole of the elevating part while flexibly deforming the locking piece, the female threaded section of the locking piece is pressed against and engages the male threaded section of the inserted leg shaft with a force of the locking piece to restore an original shape. When the leg device is attached to an object via the fastening portion of the base section, it is possible to change a distance between the lower face of the elevating part and the ground contact section of the leg shaft through rotary operation of the leg shaft, thereby enabling fine adjustment of a height of the object.

In the present invention, the elevating part has the female threaded section of the locking piece engaging the male threaded section of the leg shaft. Accordingly, when the leg shaft is rotated, the female threaded section advances or retreats spirally along the leg shaft, thereby gradually adjusting the height of the supported object. Moreover, when the locking piece is deformed to release the female threaded section from the male threaded section of the leg shaft with the operation knob of the locking piece, i.e., the other end of the locking piece is retreated, it is possible to raise or lower the elevating part along the leg shaft, thereby adjusting the height of the supported object.

According to the present invention, the base section may be provided with an upper plate, and one end of the locking piece is integrated with the upper plate of the base section. In this case, when the operation knob is lifted, it is possible to raise or lower the elevating part along the leg shaft, thereby adjusting the height of the supported object. A finger supports the object from underneath and lifts the operation knob without any difficulty.

According to the present invention, the base section may be provided with a side plate having a groove extending horizontally, and the locking piece may be provided with a projection for inserting into the groove. When an object is supported, the female threaded section of the locking piece engages the male threaded section of the leg shaft, thereby applying an upward force to the locking piece. The projection contacts an upper groove wall of the groove to receive the force, thereby preventing damage on the locking piece.

According to the present invention, an elastic engaging piece may be formed at an upper end of the leg shaft. When the leg shaft is inserted into the through hole of the base section of the elevating part, the elastic engaging piece deforms. The elastic engaging piece restores an original shape upon emerging above the through hole to engage the through hole. Accordingly, it is possible to prevent the leg shaft from falling out when the object fastened to the elevating part is lifted.

According to the present invention, the leg device for supporting an object can be appropriately constructed with the two parts, i.e., the leg shaft having the male threaded section and the elevating part having the locking piece, the female threaded section integrated with the base section having the through hole for the leg shaft and the part for fastening the object.

DETAILED DESCRIPTION OF PREFERRED EMBODIMENTS

Figure 1:
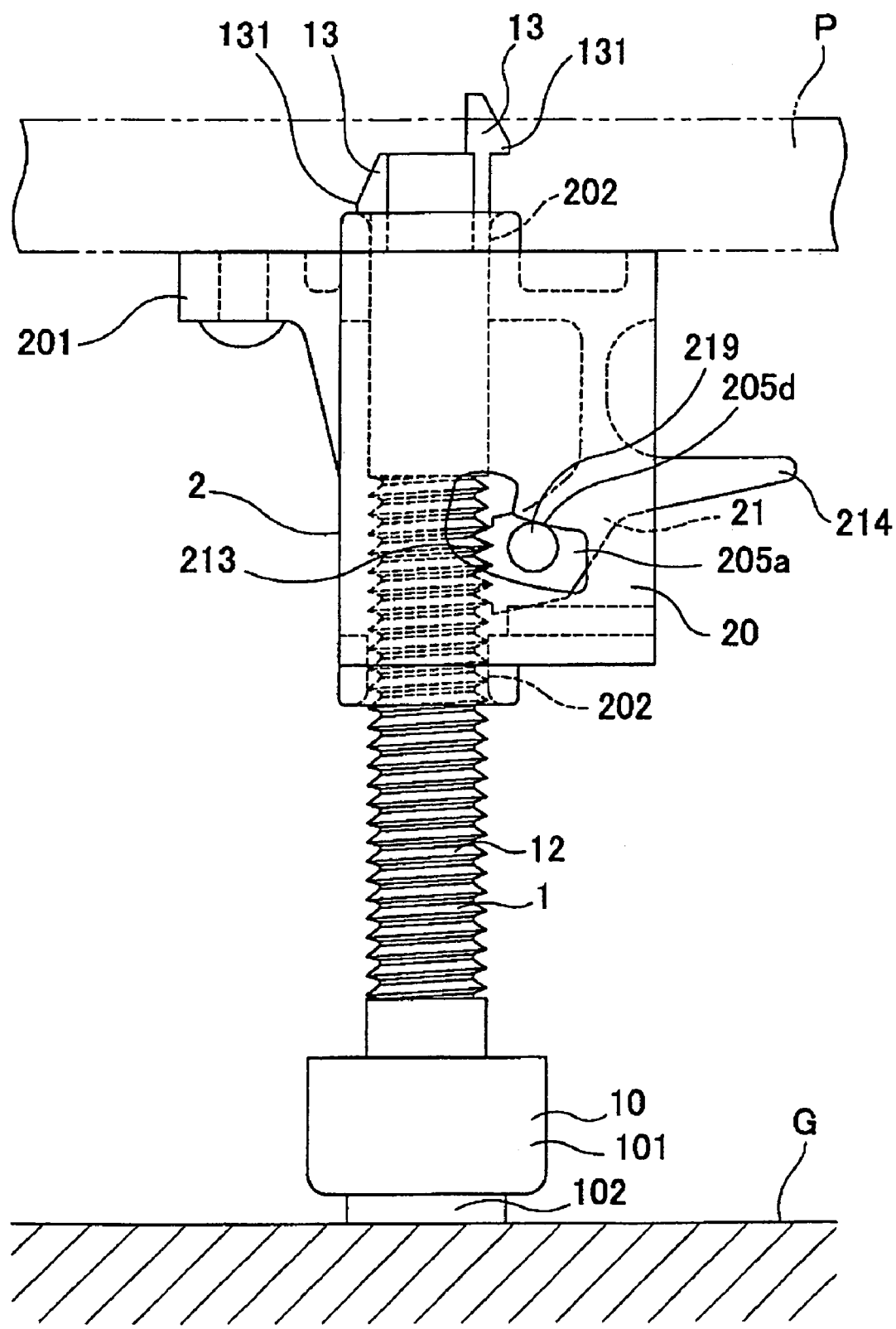
FIG. 1 is a front view of a leg device in use according to an embodiment of the present invention.
Figure 2:
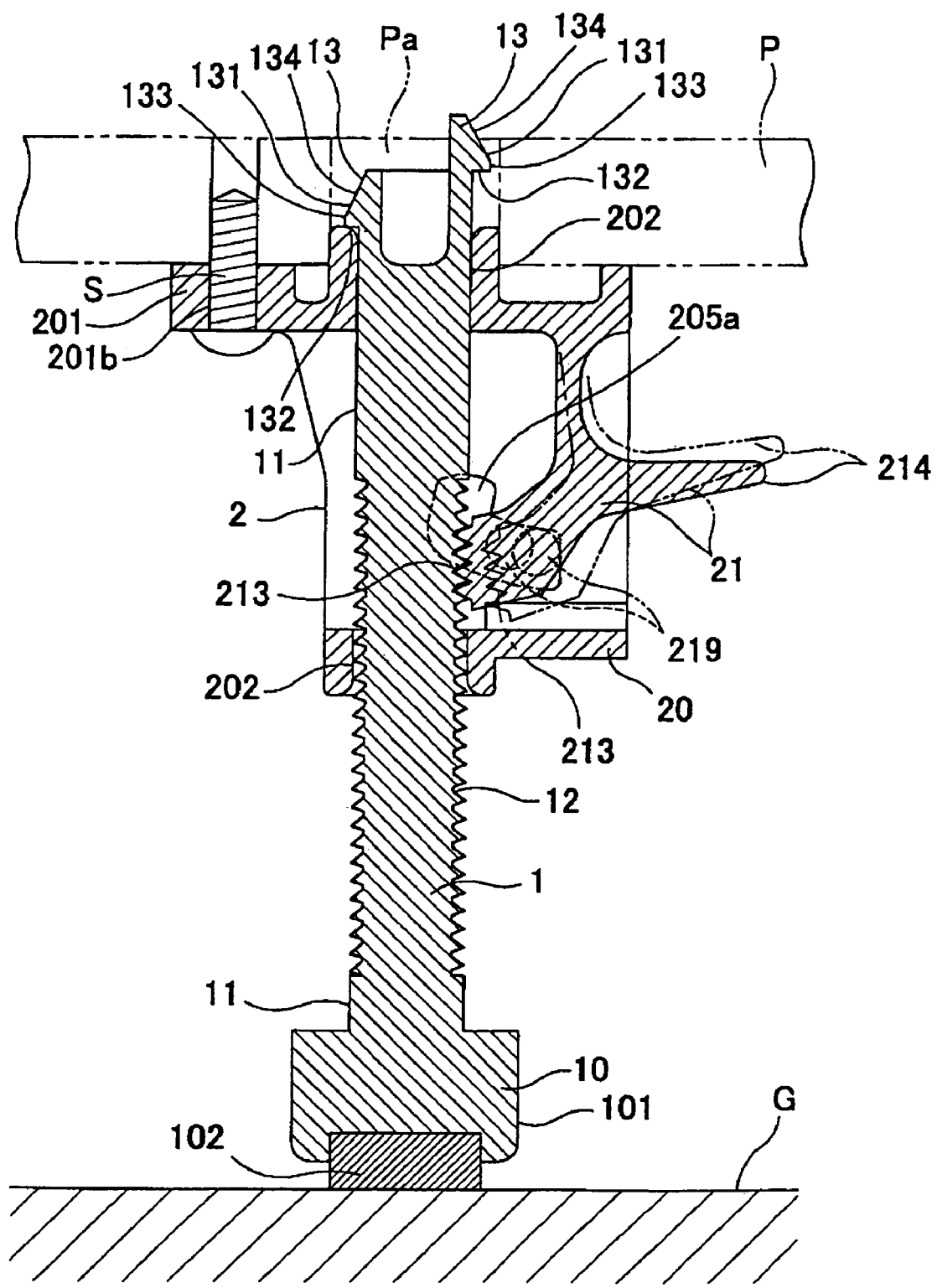
FIG. 2 is a sectional view thereof.
Figure 3:
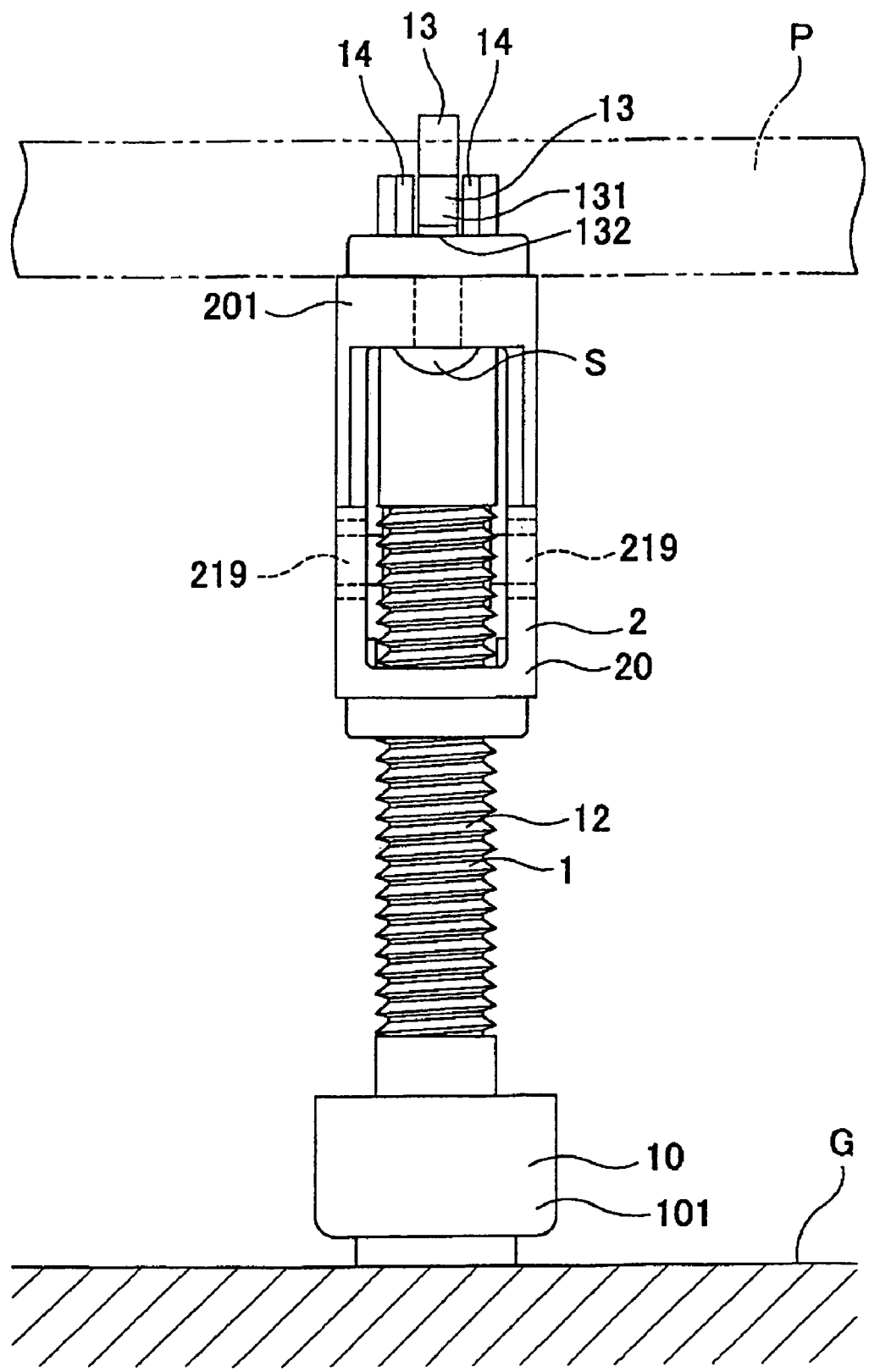
FIG. 3 is a left side view thereof.
Figure 4:
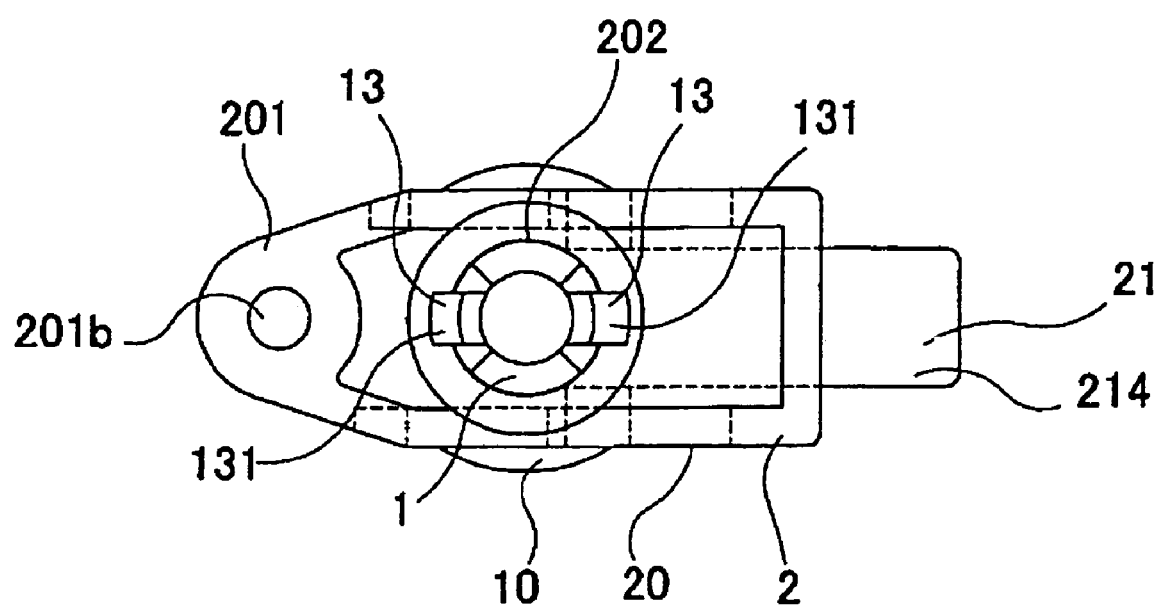
FIG. 4 is a plan view thereof.
Figure 5:
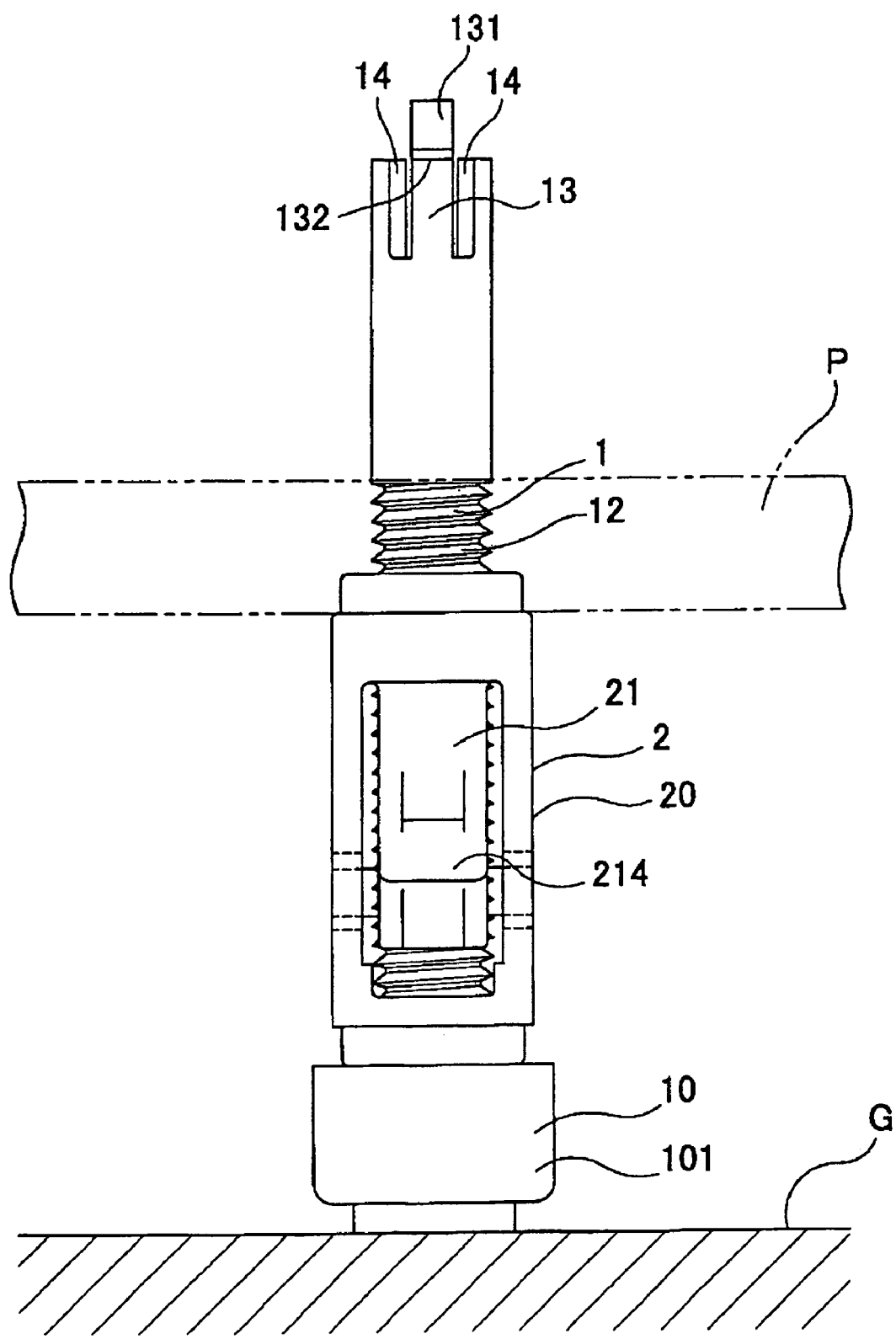
FIG. 5 is a right side view thereof.
Figure 6:
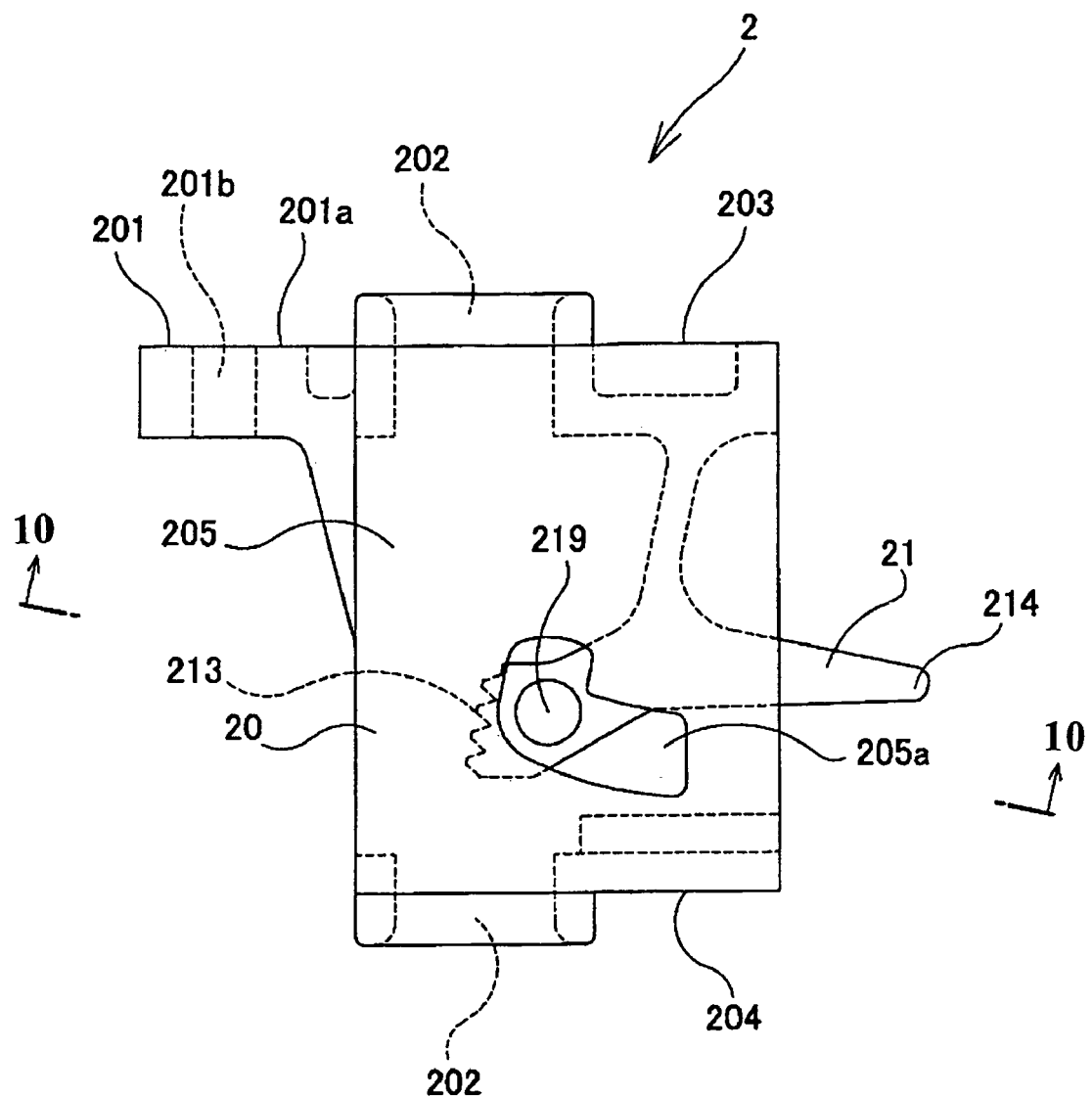
FIG. 6 is a front view of an elevating part.
Figure 7:
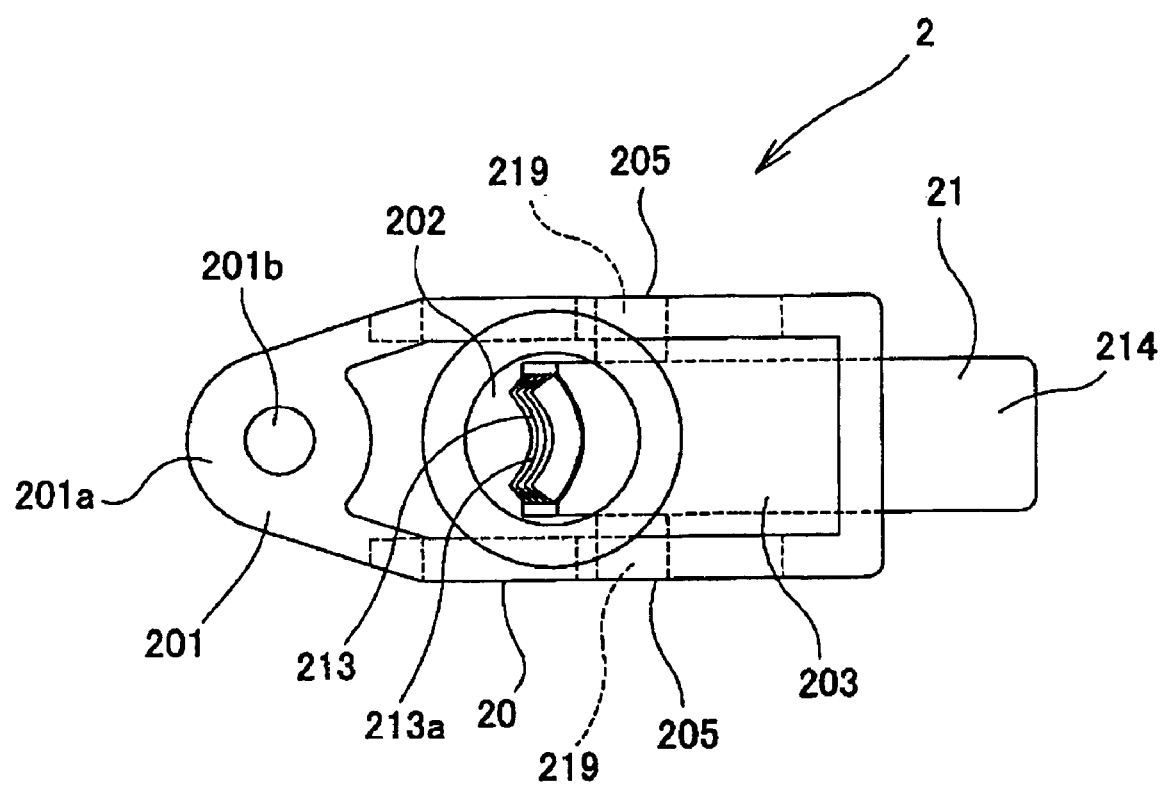
FIG. 7 is a plan view thereof.
Figure 8:
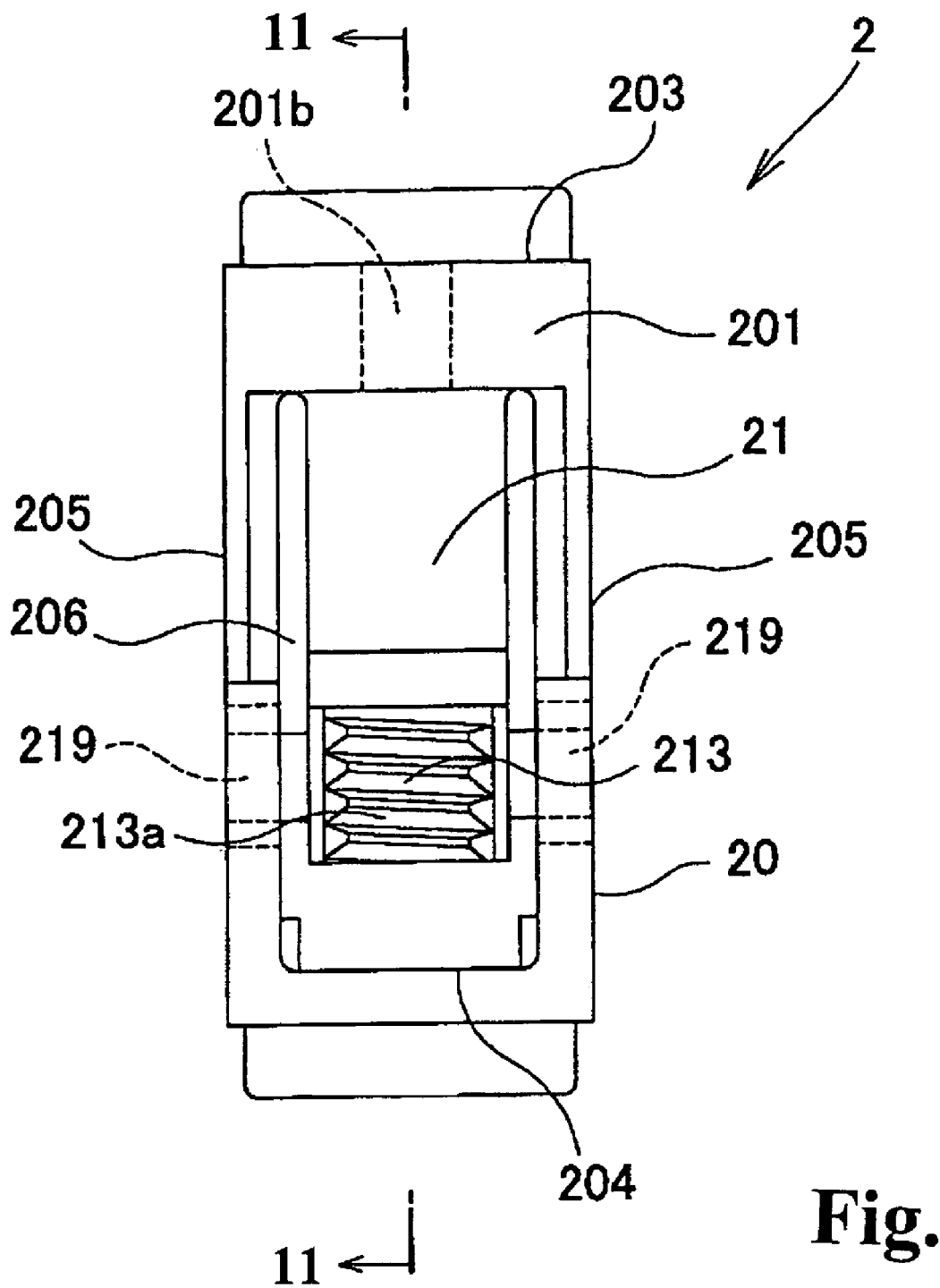
FIG. 8 is a left side view thereof.
Figure 9:
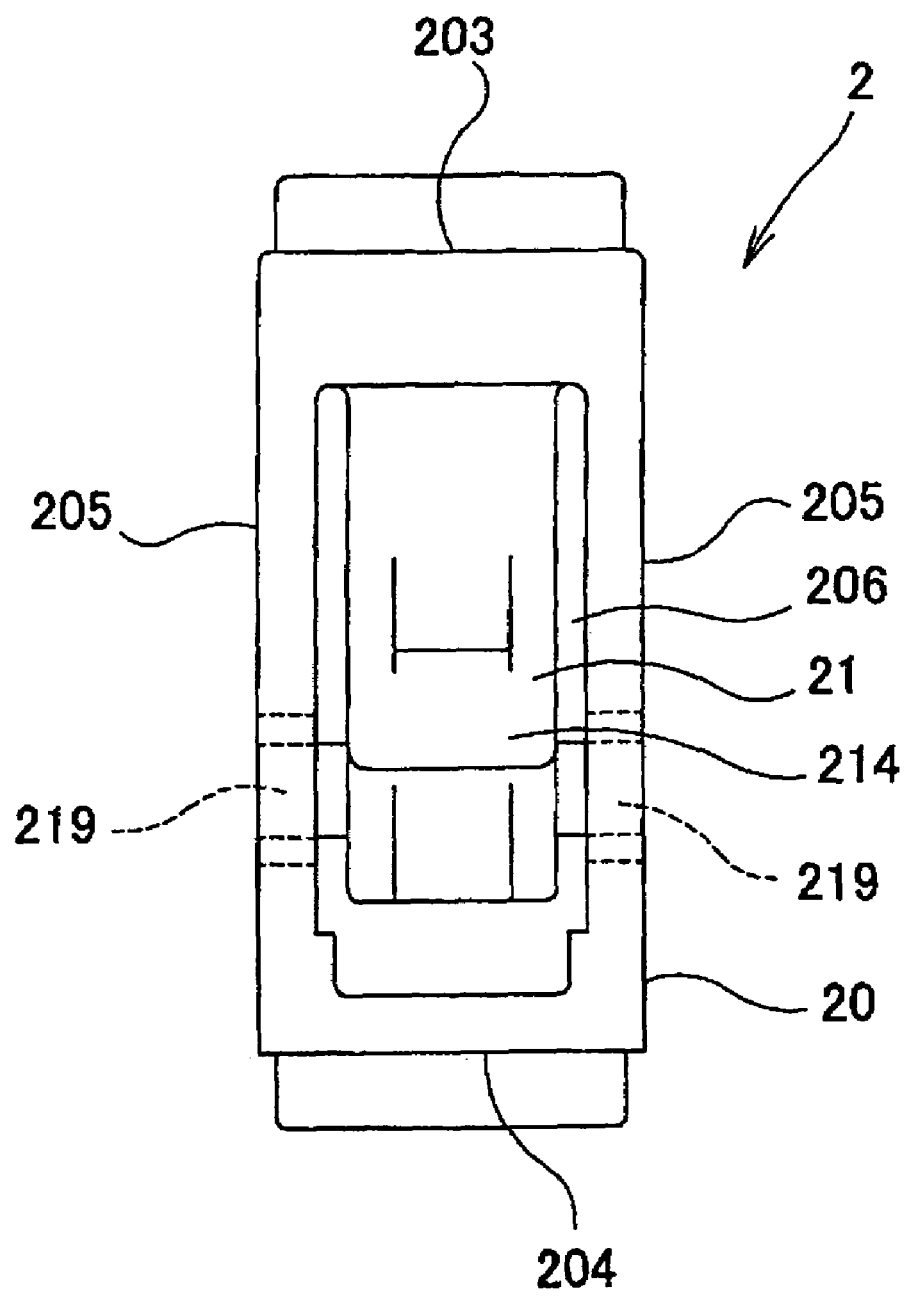
FIG. 9 is a right side view thereof.
Figure 10:
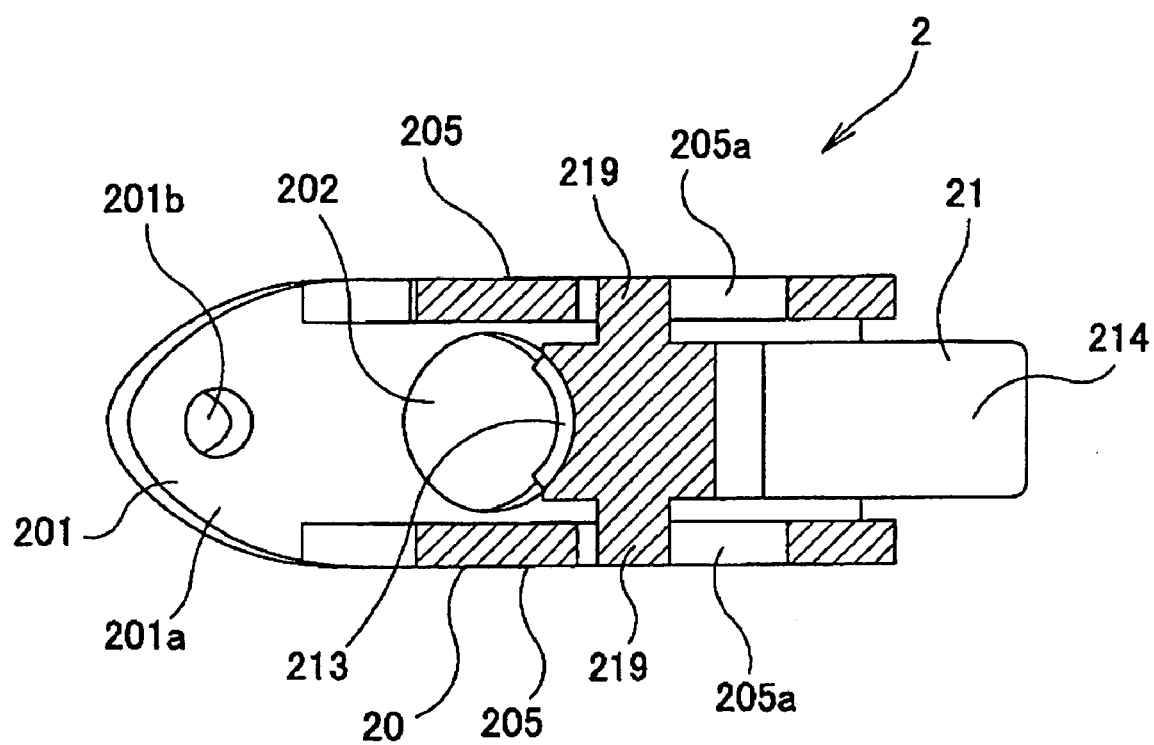
FIG. 10 is a sectional view taken along line 10—10 in FIG. 6.
Figure 11:
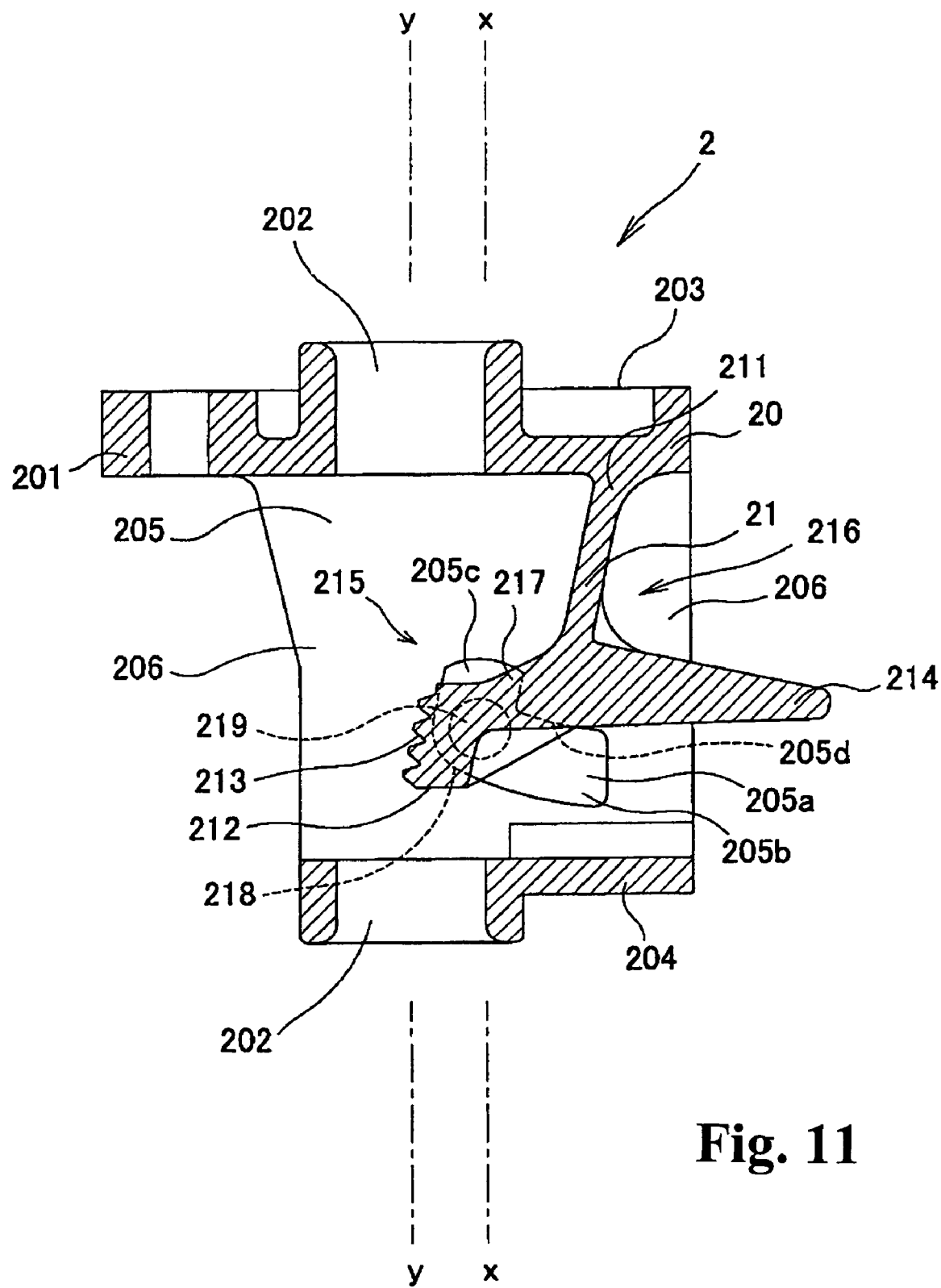
FIG. 11 is a sectional view along line 11—11 in FIG. 8.
Figure 12:
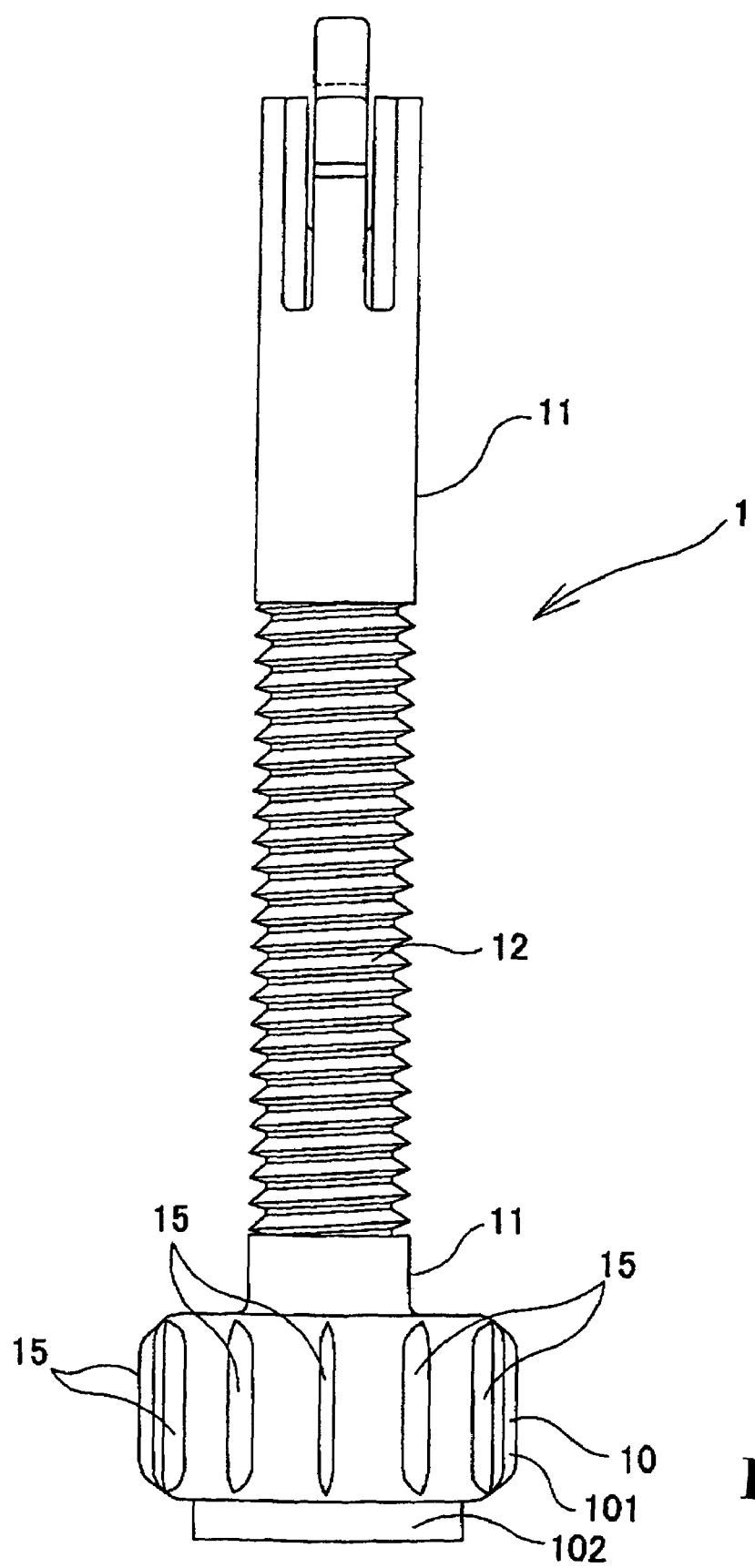
FIG. 12 is a front view of a leg shaft according to another embodiment of the present invention.
Figure 13:
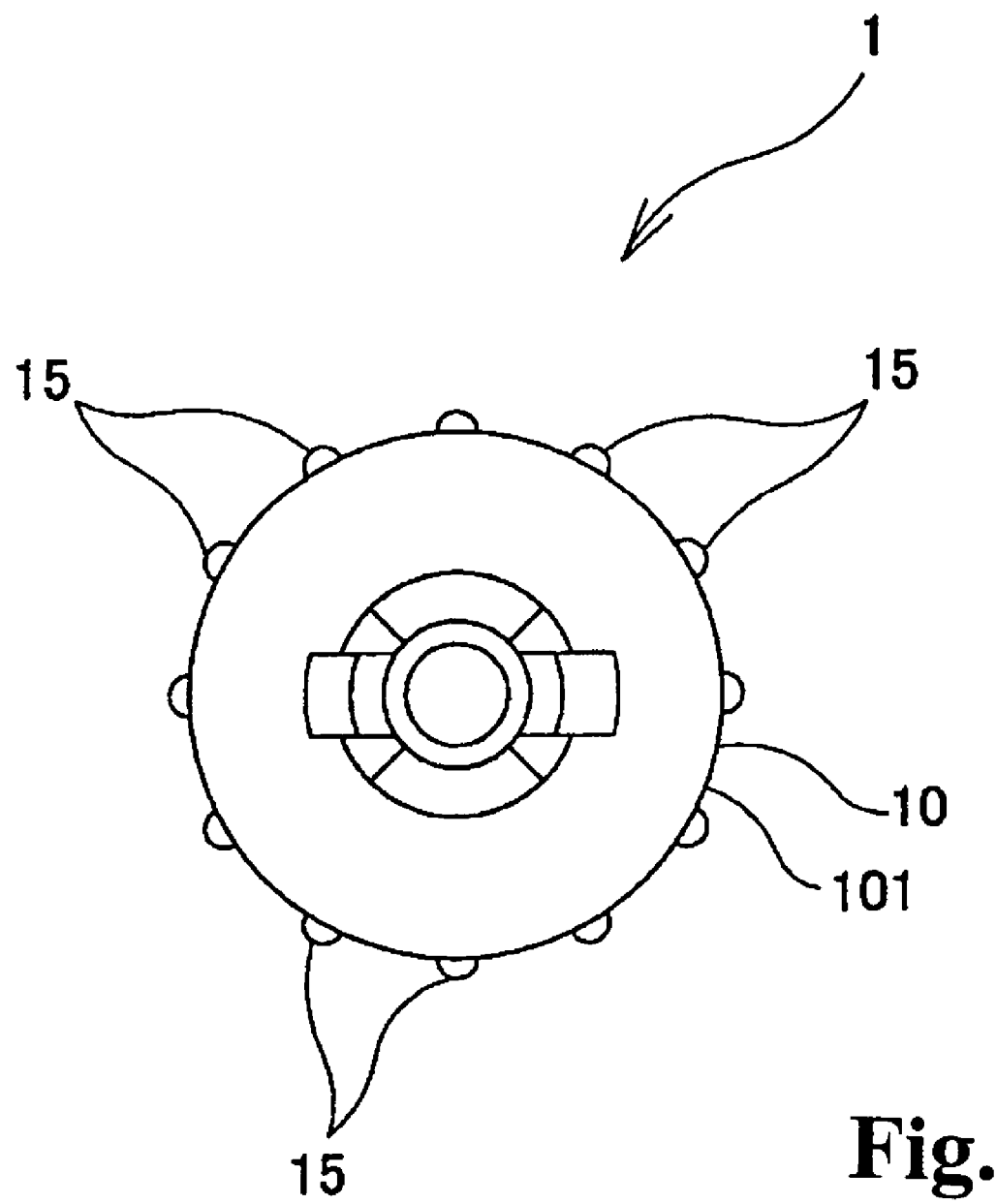
FIG. 13 is a bottom view thereof.

Hereunder, embodiments of the present invention will be explained with reference to the accompanying drawings. FIGS. 1 to 5 show a leg device in use, respectively. In particular, FIG. 5 shows a state that an elevating part 2 is at a lowest position. FIGS. 6 to 11 show the elevating part 2, respectively. FIGS. 12 and 13 show a leg shaft 1 according to another embodiment of the invention, respectively.

According to the embodiments, the leg device is attached to an object P as a leg, and has a function of supporting the object P to adjust a height thereof (height adjuster function). For example, the leg device may be used as a leg of a projection apparatus such as a liquid crystal projector, a video projector, and a slide projector. The leg device may be attached to a lower end of a tripod as a portion of a leg thereof. When the leg device is used in a projector, the leg device is disposed at a lower front section of the projector where the projection lens is disposed for adjusting an angle of the projector. Accordingly, it is possible to adjust a height of an image projected on a screen.

The leg device includes a leg shaft 1 and an elevating part 2. The leg shaft 1 is formed of a male threaded section having a ground contact section 10 at a lower end thereof. The leg shaft 1 has a disc-shaped section 101 at the lower end, and the disc-shaped section 101 includes a cushion material 102 on a lower surface thereof. The cushion material 102 contacts a ground surface G, such as a floor, ground, and table surface, to support the object P on the ground surface G.

In the embodiment, unthreaded sections 11 are provided at both lower and upper ends of the leg shaft 1, and a male threaded section 12 is provided between the unthreaded sections 11. The male threaded section 12 of the leg shaft 1 engages a female threaded section 213 of a locking piece 21 constituting the elevating part 2, so that the elevating part 2 is raised or lowered when the leg shaft 1 rotates while gripping the disc-shaped section 101. The male threaded section 12 engaging the female threaded section 213 is not provided at a position where the elevating part 2 is fully raised or lowered. Accordingly, when the elevating part 2 is fully raised or lowered, the leg shaft 1 does not rotate further, thereby preventing damage on the female threaded section 213.

In the embodiment, elastic engaging pieces 13 are formed at an upper end of the leg shaft 1. When the leg shaft 1 is inserted into through holes 202 of a base section 20 from underneath, the elastic engaging pieces 13 deform inwardly, The elastic engaging pieces 13 then restore an original shape at a location where the elastic engaging pieces 13 protrude upwardly through the through holes 202 to engage the through holes 202.

In the embodiment, the upper end portion of the leg shaft 1 is a hollow tube. The elastic engaging pieces 13 are formed between two grooves 14 extending in an axial direction of the leg shaft 1 and having ends opening outwardly at an edge of the upper end portion. The elastic engaging pieces 13 are formed at both sides of the leg shaft 1 in a radial direction. One of the elastic engaging pieces 13 projects upwardly beyond the edge of the upper end portion of the leg shaft 1.

A projection 131 is formed on an outer surface of an upper end of each of the elastic engaging pieces 13. The projection 131 has a catching surface 132 facing the lower end of the leg shaft 1 and a slanted surface 134. The slanted surface 134 is formed above a crest 133 and inclined such that the projection 131 gradually projects outwardly toward the crest 133. A distance between the crests 133 of the projections 131 is slightly greater than a diameter of the through holes 202 of the elevating part 2.

When the elevating part 2 with the leg shaft 1 is inserted into the through holes 202, the slanted surfaces 134 abut against a rim of the through holes 202 to smoothly deform the elastic engaging pieces 13. The elastic engaging pieces 13 restore the original shape at the position where they emerge above the through holes 202 and engage the through holes 202. Accordingly, when the object P fastened to the elevating part 2 is lifted, the leg shaft 1 does not unexpectedly fall out of the through holes 202 of the elevating part 2.

In the embodiment, one of the elastic engaging pieces 13, extends upwardly further than the other of the elastic engaging pieces 13. The crests 133 of the projections 131 are positioned at different heights. Accordingly, when the leg shaft 1 is inserted into the through holes 202, both of the elastic engaging pieces 13 do not deform inwardly at the same time, thereby making the insertion easy.

In the embodiment, the leg device is so constructed that the female threaded section 213 of the locking piece 21 remains engaging the male threaded section 12 of the leg shaft 1 at the position where the catching surface 132 of the projection 131 of one of the elastic engaging pieces 13 (the shorter one) engages the upper opening of the through holes 202 of the elevating part 2. When the elevating part 2 is raised further by rotating the leg shaft 1 to position the female threaded section 213 of the locking piece 21 at the unthreaded section 11, the catching surface 132 of the projection 131 of the other of the two elastic engaging pieces 13 (the longer one) engages the upper opening of the through holes 202 of the elevating part 2. Accordingly, it is possible to prevent the leg shaft 1 from falling out of the elevating part 2 at the location where the elevating part 2 is raised to the full extent.

FIGS. 12 and 13 show a structure wherein a plurality of ribs 15 is formed in a thickness direction of the disc-shaped section 101 of the leg shaft 1 with a specific interval in a circumferential direction, thereby making it easy to grip the disc-shaped section 101 to rotate the leg shaft 1. When the elevating part 2 is lowered, the leg shaft 1 projects further above the upper surface of the elevating part 2. Typically, a housing space Pa is formed at a location where the elevating part 2 is attached to the supported object P for receiving the leg shaft 1 passing through the through holes 202 of the elevating part 2 and projecting as described above.

The elevating part 2 is supported on the leg shaft 1 to rise or lower. The elevating part 2 integrally includes the base section 20 and the locking piece 21. The base section 20 includes a fastening portion 201 to fasten the supported object P, and the through holes 202 for the leg shaft 1. In the embodiment, the base section 20 is constructed to form a box, with substantially rectangular upper plate 203, lower plate 204, side plates 205 disposed between long sides of the upper plate 203 and lower plate 204, and two openings 206 on both left and right sides. The through holes 202 for the leg shaft 1 are formed in the upper plate 203 and lower plate 24 at the location near ones of the short sides.

An extension 201a is formed to extend laterally from one of the short sides of the upper plate 203 at the upper section of the base section 20. The elevating part 2 is fastened to the supported object P with a screw S inserted into a hole 201b disposed in the extension 201a from underneath and screwed into the lower surface of the supported object P when superposed on the upper plate 203.

One end 211 of the locking piece 21 is integrally formed on the base section 20. The other end 212 is provided with a female threaded section 213 to engage the male threaded section 12 of the leg shaft 1 at the front face 215 thereof, and an operation knob 214 at the rear face 216 thereof.

In the embodiment, the locking piece 21 is a plate formed between the inner faces of the pair of side plates 205 of the base section 20, and has a width to form a gap with each of the inner surfaces. The locking piece 21 also has a front face 215 facing the through holes 202 and the opposing rear face 216. The female threaded section 213 may be formed of a single rib or multiple ribs on the front face 215 of the end 212 of the locking piece 21 td engage the male threaded section of the leg shaft 1. In the embodiment, the female threaded section 213 is formed of a female thread 213a for engaging the male threaded section of the leg shaft 1, on the front face 215 of the end 212 of the locking piece 21. An operation knob 214 extends from the rear face 216 of the end 212 of the locking piece 21 to project an end section thereof outwardly from the opening 206 of the base section 20 located near the rear face 216.

In the embodiment, the base section 20 and the locking piece 21 are integrally formed by plastic molding, so that the female threaded section 213 of the locking piece 21 is positioned at a more inwardly penetrated location than the outer surface of the leg shaft 1 passing through the through holes 202. Namely, the locking piece 21 extends from one side that interposes the axis of the leg shaft 1 to position the female threaded section 213 at a location that passes beyond an outer surface position x of the leg shaft 1 located on the side to approach a y axis of the leg shaft 1, or on the y axis, or further enters into the other side that interposes the y axis therebetween.

More specifically, in the embodiment, the base section 20 and the locking piece 21 are integrally formed by plastic molding so as to substantially position the female threaded section 213 of the locking piece 21 at the location of the y axis of the leg shaft 1 passing through the aforementioned through holes 202.

In particular, the base section 20 is provided with openings 206 on the left and right sides. Through the openings 206 provided on the left and right sides, the locking piece 21 can be easily and appropriately formed integrally with the base section 20 within the base section 20 by plastic molding. As a result, the locking piece 21 can be flexibly deformed in the direction to retreat the end 212 including the female threaded section 213 by using the end 211 as the center of the deformation. More specifically, the locking piece 21 can be flexibly deformed by operating the operation knob 214 that projects from the opening 206 of the base section 20. (The retreated position of the locking piece 21 is indicated with a dashed line in FIG. 2.)

With the structure described above, the leg device for supporting the object P is appropriately constructed with two parts, i.e., the leg shaft 1 and the elevating part 2. In other words, by allowing the leg shaft 1 to penetrate into the through holes 202 of the elevating part 2 while flexibly deforming the locking piece 21, the female threaded section 213 of the locking piece 21 is pressed against and engages the male threaded section 12 of the leg shaft 1 with the restoration force of the locking piece 21. The leg device attached to the supported object P with the fastening portion 201 of the base section 20 varies the distance between the lower face of the elevating part 2 and the ground contact section 10 of the leg shaft 1 through the rotary operation of the leg shaft 1, thereby enabling fine adjustment of the height of the supported object P.

The elevating part 2 has the female threaded section 213 of the locking piece 21 engaging the male threaded section 12 of the leg shaft 1. Accordingly, the female threaded section 213 advances or retreats spirally along the leg shaft 1 relative to the rotation of the leg shaft 1, thereby enabling gradual changes in the height of the supported object P. Moreover, the elevating part 2 can be extensively raised or lowered along the leg shaft 1 by using the operation knob 214 of the locking piece 21 to flexibly deform the locking piece 21 so as to disengage the female threaded section 213 from the male threaded section 12 of the leg shaft 1, i.e., by causing the other end of the locking piece 21 to retreat. Thus, the height of the supported object P can be adjusted extensively.

In the embodiment, the end 211 of the locking piece 21 is formed integrally with the upper plate 203 of the base section 20. More specifically, the end 211 of the locking piece 21 is integrally connected with the inner face of the upper plate 203 in the vicinity of the short side opposite to the side where the through holes 202 is formed in the upper plate 203 of the base section 20. The locking piece 21 protrudes downwardly in a gradual slant in the direction to penetrate into the base section 20 from the end 211 toward the other end 212. The end 212 includes a head section 218 having the female threaded section 213 via a neck section 217 on the front face 215, and the operation knob 214 on the rear face 216. The front face 215 of the head section 218, namely, the surface where the female threaded section 213 is formed, is slanted in the same direction as the slant before the leg shaft 1 passes through. When the leg shaft 1 is inserted, the locking piece 21 is flexibly retreated to the position where the surface is substantially parallel to the axis y of the leg shaft 1.

In the embodiment, the elevating part 2 can be extensively raised or lowered along the leg shaft 1 by lifting the operation knob 214, thereby extensively adjusting the height of the supported object P. The extensive adjustment can be achieved with a finger of a hand that supports the object P from underneath without any difficulty. Laterally extending grooves 205a are formed in the side plates 205 of the base section 20; and projections 219 that penetrate these grooves 205a are formed on the sides of the end 212 of the locking piece 21.

In the embodiment, the projections 219 of the locking piece 21 are formed on the sides of the locking piece 21 where the head section 218 and the neck section 217 are connected. The projections are disposed on both sides of the locking piece 21. The grooves 205a are formed on both side plates 205 of the base section 20. The projections 219 of the locking piece 21 are formed by plastic molding through the grooves 205a in a state that the projections 219 of the locking piece 21 are penetrated into the respective grooves 205a. Each groove 205a has a main groove section 205b formed along a track of the projection 219 upon the flexible deformation of the locking piece 21, and a sub-groove section 205c extending upwardly and communicating with a groove edge of the main groove section 205b where the through holes 202 are formed.

When the object P is supported, an upward force is applied to the locking piece 21 with the female threaded section 213 engaging the male threaded section 12 of the leg shaft 1. The projections 219 contacts the upper groove walls 205d of the grooves 205a (the main grooves 205a) to receive the force, thereby preventing the locking piece 21 from damaging.

The disclosure of Japanese Patent Application No. 2004-110964, filed on Apr. 5, 2004, is incorporated in the application.

While the invention has been explained with reference to the specific embodiments of the invention, the explanation is illustrative and the invention is limited only by the appended claims.

What is claimed is:
1. A leg device for supporting an object, comprising:
 a leg shaft having a male threaded section and a contact section at a lower end thereof, and
 an elevating part including a base section adapted to be attached to the object and having a through hole for inserting the leg shaft, and a locking piece having one end integrated with the base section and the other end having a female threaded section for engaging the male threaded section at a front side and an operation knob, said base section and said locking piece being integrally formed such that when the leg shaft is disposed in the through hole, the female threaded section is urged to the male thread section to engage thereto.

2. A led device according to claim 1, wherein said base section and said locking piece are integrally formed with plastic molding such that the female threaded section is situated inwardly toward a center of the leg shaft beyond an outer surface of the leg shaft.

3. A leg device according to claim 1, wherein said base section further includes an upper plate, said locking piece having said one end integrated with the upper plate.

4. A leg device according to claim 1, wherein said base section further includes a side plate having a groove, said locking piece having a projection inserted into the groove.

5. A leg device according to claim 4, wherein said groove includes a lateral groove portion with an upper edge so that the projection contacts the upper edge when a load is applied to the leg shaft through the locking piece, to thereby support the load by the side plate.

6. A leg device according to claim 1, wherein said leg shaft further includes an engaging piece at an upper end thereof, said engaging piece deforming when the leg shaft is inserted into the through hole and restoring an original shape thereof to engage the through hole when the engaging piece emerges above the through hole.

* * * * *